(12) United States Patent
Tseng (10) Patent No.: US 8,827,614 B2
(45) Date of Patent: Sep. 9, 2014

(54) FLOATING FASTENER ALLOWING A HIGH PRE-POSITIONING TOLERANCE (75) Inventor: Ying-Chih Tseng, New Taipei (TW)

(73) Assignee: Hanwit Precision Industries Ltd., New Taipei (TW)

( * ) Notice: Subject to any disclaimer, the term of this patent is extended or adjusted under 35 U.S.C. 154(b) by 128 days.

(21) Appl. No.: 13/599,381

(22) Filed: Aug. 30, 2012

(65) Prior Publication Data
US 2014/0064876 A1 Mar. 6, 2014

(51) Int. Cl.
F16B 39/28 (2006.01)
(52) U.S. Cl.
USPC .......................................... 411/107; 411/353
(58) Field of Classification Search
USPC ................... 411/107, 147, 353, 396
IPC ...................................................... F16B 39/28
See application file for complete search history.

(56) References Cited

U.S. PATENT DOCUMENTS

| | | | | |
|---|---|---|---|---|
| 6,280,131 B1 * | 8/2001 | Ellis et al. | ...................... | 411/353 |
| 6,309,158 B1 * | 10/2001 | Bellinghausen et al. | ..... | 411/353 |
| 6,464,438 B1 * | 10/2002 | Dowling | ........................ | 411/107 |
| 6,468,012 B2 * | 10/2002 | Ellis et al. | ...................... | 411/353 |
| 7,213,321 B2 * | 5/2007 | Franco et al. | .................... | 29/453 |
| 7,922,432 B2 * | 4/2011 | Chiu | .............................. | 411/107 |
| 8,066,461 B2 * | 11/2011 | Travers | ........................... | 411/352 |
| 8,087,861 B2 * | 1/2012 | Wang | .............................. | 411/107 |
| 8,388,288 B2 * | 3/2013 | Chiu | .............................. | 411/107 |
| 2003/0063960 A1 * | 4/2003 | Allen | ............................. | 411/107 |
| 2010/0290861 A1 * | 11/2010 | Wang | ............................. | 411/107 |

* cited by examiner

Primary Examiner — Gary Estremsky
(74) Attorney, Agent, or Firm — Muncy, Geissler, Olds & Lowe, P.C.

(57) ABSTRACT

A floating fastener includes a mounting base member defining a center through hole and an inward rim, a socket vertically and horizontally movably coupled to the mounting base member and stoppable below the inward rim of the mounting base member, a lock screw floatably supported on an elastic member in the socket inside the mounting base member and movable with the socket to correct positioning for detachably locking a first panel member carrying the mounting base member to a second panel member, and a stop member mounted in the socket to prohibit the lock screw from falling out of the socket.

8 Claims, 9 Drawing Sheets

FLOATING FASTENER ALLOWING A HIGH PRE-POSITIONING TOLERANCE

BACKGROUND OF THE INVENTION

1. Field of the Invention

The present invention relates to fastener means for joining two metal panel members and more particularly, to a floating fastener consisting of a mounting base member, a socket, a lock screw, an elastic member and a stop member, which allows a high pre-positioning tolerance, preventing lock screw damage during fastening of the lock screw to lock a first panel member to a second panel member.

2. Description of the Related Art

When joining panel members, fastening devices respectively formed of a screw nail, a rotary knob and a washer may be used. During application, the screw nail, rotary knob and washer of each fastening device are assembled and then mounted at a first panel member. When fastening the first panel member to a second panel member, rotate the rotary knob of each fastening device to drive the respective screw nail into a respective mounting screw hole at the second panel member, and then use a hand tool to fasten tight the screw nail. This multiple panel member fastening method can be used in a machine tool or other situations where multiple panel members are to be fastened in a stack. In a machine tool, the location where panel members are fastened together may be at the power drive or speed-adjustment unit inside the housing.

Further, floating fasteners or floating captive screws are created to facilitate easy installation and removal of attached pieces without release of the screw. Regular floating captive crews commonly comprise a mounting base member, a spring member mounted inside the mounting base member, a lock screw supported on the spring member, and a cap affixed to the head of the lock screw and axially slidably coupled to the mounting base member. During application, the mounting base member is affixed to a mounting through hole on a first panel member. When attaching the first panel member to a second panel member, lower the cap to compress the spring member and to force the lock screw toward a mounting screw hole at the second panel member, and then rotate the cap to drive the lock screw into the mounting screw hole of the second panel member. Thereafter, use a hand tool to fasten tight the lock screw. Further, after disconnection of the lock screw from the mounting screw hole of the second panel member, the first panel member can be removed from the second panel member, and the floating captive screw is kept secured to the first panel member, avoiding missing the component parts.

The aforesaid floating captive screws are intensively used in telecommunication machine cabinets, industrial computers and machine tools to detachably lock panel members of machine cases. However, due to manufacturing tolerances, the mounting through hole at the first panel member may be not kept in accurate alignment with the corresponding mounting screw hole at the attached second panel member. At this time, the lock screw of the floating captive screw at the first panel member may have to be slightly tilted so that it can be driven into the mounting screw hole at the second panel member. However, driving the tilted lock screw into the mounting screw hole at the second panel member in a tilted manner may damage the threads of the lock screw, or cause the lock screw to break. Therefore, an improvement in this regard is necessary.

SUMMARY OF THE INVENTION

The present invention has been accomplished under the circumstances in view. It is therefore the main object of the present invention to provide a floating fastener, which facilitates accurate alignment between the lock screw and the target mounting screw hole before joining panel members, avoiding structural damage during installation.

To achieve this and other objects of the present invention, a floating fastener comprises a mounting base member, a socket, and a lock screw. The mounting base member is affixed to a first panel member, defining a center through hole and an inward rim. The socket is vertically and horizontally movably coupled to the mounting base member and stoppable below the inward rim of the mounting base member. The lock screw is floatably supported on an elastic member in the socket inside the mounting base member, and movable with the socket into perfect alignment with a mounting screw hole at a second panel member for locking the first panel member to the second panel member positively without causing damage In one embodiment of the present invention, the socket defines an annular bottom stop flange around the periphery of the bottom wall thereof in a flush manner and stoppable below the inward rim of the mounting base member, and the inward rim of the mounting base member is disposed around the periphery of the socket above the annular bottom stop flange for allowing the socket to be moved vertically and horizontally relative to the mounting base member within a predetermined range.

In another embodiment of the present invention, the socket defines a limiter groove around the periphery thereof, and the inward rim of the mounting base member is coupled to the limiter groove in such a manner that the socket can be moved vertically and horizontally relative to the mounting base member within a predetermined range subject to the constraint of the height of the limiter groove and the inner diameter of the inward rim.

DETAILED DESCRIPTION OF THE PREFERRED EMBODIMENT

Referring to FIGS. 1, 2, 3 and 4, a floating fastener in accordance with a first embodiment of the present invention is shown. The floating fastener comprises a mounting base member 1, a socket 2, a stop member 23, a lock screw 3, and an elastic member 34.

The mounting base member 1 comprises an open-top accommodation chamber 13, a bottom mounting part 12 disposed at the bottom side of the open-top accommodation chamber 13, a center through hole 11 vertically cut through opposing top and bottom sides of the bottom mounting part 12 in communication with the open-top accommodation chamber 13, and an inward rim 14 suspending above the open-top accommodation chamber 13 around the top open side of the mounting base member 1 and defining a floating space 10 in the open-top accommodation chamber 13. The bottom mounting part 12 comprises a base portion 121 defining a flat bottom wall 1211, an annular bottom flange 122 perpendicularly downwardly extended from the flat bottom wall 1211 of the base portion 121 around the center through hole 11, and a locating groove 1221 extending around the periphery of the annular bottom flange 122.

The socket 2 is vertically movably coupled to the open-top accommodation chamber 13 of the mounting base member 1, comprising an annular bottom stop flange 22 extending around the periphery of the bottom wall thereof in a flush manner and stoppable below the inward rim 14 of the mounting base member 1, an open-bottom lower chamber 21, an open-top upper chamber 211 disposed in communication with and having a relatively greater diameter than the open-bottom lower chamber 21, and an annular inside stop flange 212 defined between the open-bottom lower chamber 21 and the open-top upper chamber 211, The stop member 23 can be a C-shaped retainer or washer. In this embodiment, the stop member 23 is a C-shaped retainer fastened to the lock screw 3 and stoppable at the bottom side of the annular inside stop flange 212 of the socket 2.

The lock screw 3 comprises a head 31 suspending above the socket 2, a plain shank 32 perpendicularly extended from a center part of the bottom wall of the head 31 and inserted through the annular inside stop flange 212 of the socket 2, a screw rod 33 axially extended from the distal end of the plain shank 32 and having a relatively greater outer diameter than the plain shank 32 and movable with the plain shank 32 in and out of the center through hole 11 of the mounting base member 1, a toothed (or grooved) grip 312 formed integral with the periphery of the head 31, and a tool-receiving device 311 located on the top wall of the head 31. Further, the tool-receiving device 311 can be a Phillipes groove or block, a keystone groove or block, an asterisk groove or block, or a hex groove or block.

The elastic member 34 can be, for example, a compression spring 34 sleeved onto the screw rod 33 and plain shank 32 of the lock screw 3 and stoppable between the head 31 of the lock screw 3 and the annular inside stop flange 212 of the socket 2.

When assembling the floating fastener, sleeve the elastic member 34 onto the plain shank 32 of the lock screw 3, and then insert the lock screw 3 with the elastic member 34 into the open-top upper chamber 211 of the socket 2 to force the screw rod 33 of the lock screw 3 through the annular inside stop flange 212 of the socket 2 into the open-bottom lower chamber 21 and to have the elastic member 34 be supported on the annular inside stop flange 212 of the socket 2, and then fasten the stop member 23 to the plain shank 32 of the lock screw 3 by means of the use of a tool to have the stop member 23 be stopped at the bottom side of the annular inside stop flange 212 of the socket 2 and to allow axial movement of the plain shank 32 relative to the stop member 23. After removal of the tool and release of pressure from the lock screw 3, the elastic member 34 immediately returns to its normal shape to push the lock screw 3 upwardly to the extent where the screw rod 33 of the lock screw 3 is stopped at the bottom side of the stop member 23.

Thereafter, insert the annular bottom stop flange 22 of the socket 2 into the open-top accommodation chamber 13 of the mounting base member 1, and then use a stamping tool to stamp the top edge of the mounting base member 1 and to form the desired inward rim 14 at the top side of the mounting base member 1. The inward rim 14 has an inner diameter relatively smaller than the outer diameter of the annular bottom stop flange 22 of the socket 2, and therefore, the annular bottom stop flange 22 of the socket 2 can be stopped at the bottom side of the inward rim 14 to prohibit falling of the socket 2 out of the mounting base member 1. At this time, the socket 2 can be moved up and down in the floating space 10 inside the mounting base member 1, and the elastic member 34 is stopped between the head 31 of the lock screw 3 and the annular inside stop flange 212 of the socket 2, i.e., the lock screw 3 is floatably supported in the socket 2 and the mounting base member 1.

Referring to FIGS. 5, 6, 7 and 8, the floating fastener is installed in a mounting through hole 41 of a first panel member 4 and detachably fastened to a mounting screw hole 51 of a second panel member 5 to lock the first panel member 4 and the second panel member 5. When installing the floating fastener in the first panel member 4, insert the annular bottom flange 122 of the bottom mounting part 12 of the mounting base member 1 into the mounting through hole 41 of the first panel member 4, and then use a stamping tool to impart a downward pressure to the head 31 of the lock screw 3 against the socket 2, the mounting base member 1 and the first panel member 4, riveting the locating groove 1221 to the peripheral wall of the mounting through hole 41 of the first panel member 4. Because the annular bottom stop flange 22 of the socket 2 has a relatively greater diameter than the center through hole 11 of the mounting base member 1, the aforesaid riveting operation does not cause the socket 2 to damage the border edge of the center through hole 11 of the mounting base member 1.

When going to lock the first panel member 4 to the second panel member 5, attach the first panel member 4 to the second panel member 5 to keep the mounting through hole 41 in axial alignment with the mounting screw hole 51 of the second panel member 5. At this time, the screw rod 33 of the lock screw 3 may not be kept in accurate alignment with the mounting screw hole 51 of the second panel member 5. Thus, the user can impart a transverse pressure to the lock screw 3 to move the socket 2 in the floating space 10 inside the open-top accommodation chamber 13 of the mounting base member 1, shifting the screw rod 33 of the lock screw 3 into axial alignment with the mounting screw hole 51 of the second panel member 5 for locking.

Thereafter, the user can force the head 31 of the lock screw 3 downwardly to compress the elastic member 34 and to move the screw rod 33 through the open-bottom lower chamber 21 of the socket 2 and the center through hole 11 of the mounting base member 1 into the mounting screw hole 51 of the second panel member 5, and then rotate the lock screw 3 to thread the screw rod 33 into the mounting screw hole 51 of the second panel member 5, and then attach a power tool or hand tool to the tool-receiving device 311 of the lock screw 3 to fasten tight the lock screw 3 to the mounting screw hole 51 of the second panel member 5, locking the first panel member 4 to the second panel member 5. Because the lock screw 3 can be moved with the socket 2 transversely relative to the mounting base member 1 into accurate alignment with the mounting screw hole 51 of the second panel member 5 before locking, fastening the screw rod 33 to the mounting screw hole 51 of the second panel member 5 does not cause any damage to the threads of the screw rod 33.

Figure 1:
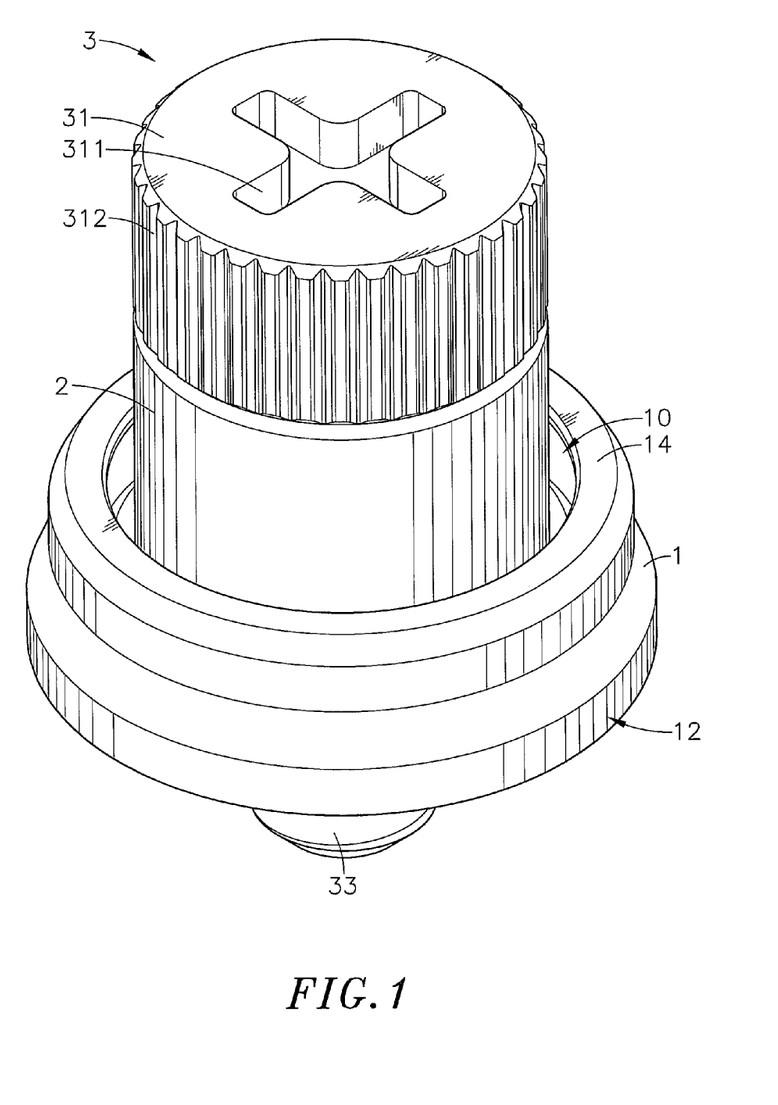
FIG. 1 is an oblique top elevational view of a floating fastener in accordance with a first embodiment of the present invention.
Figure 2:
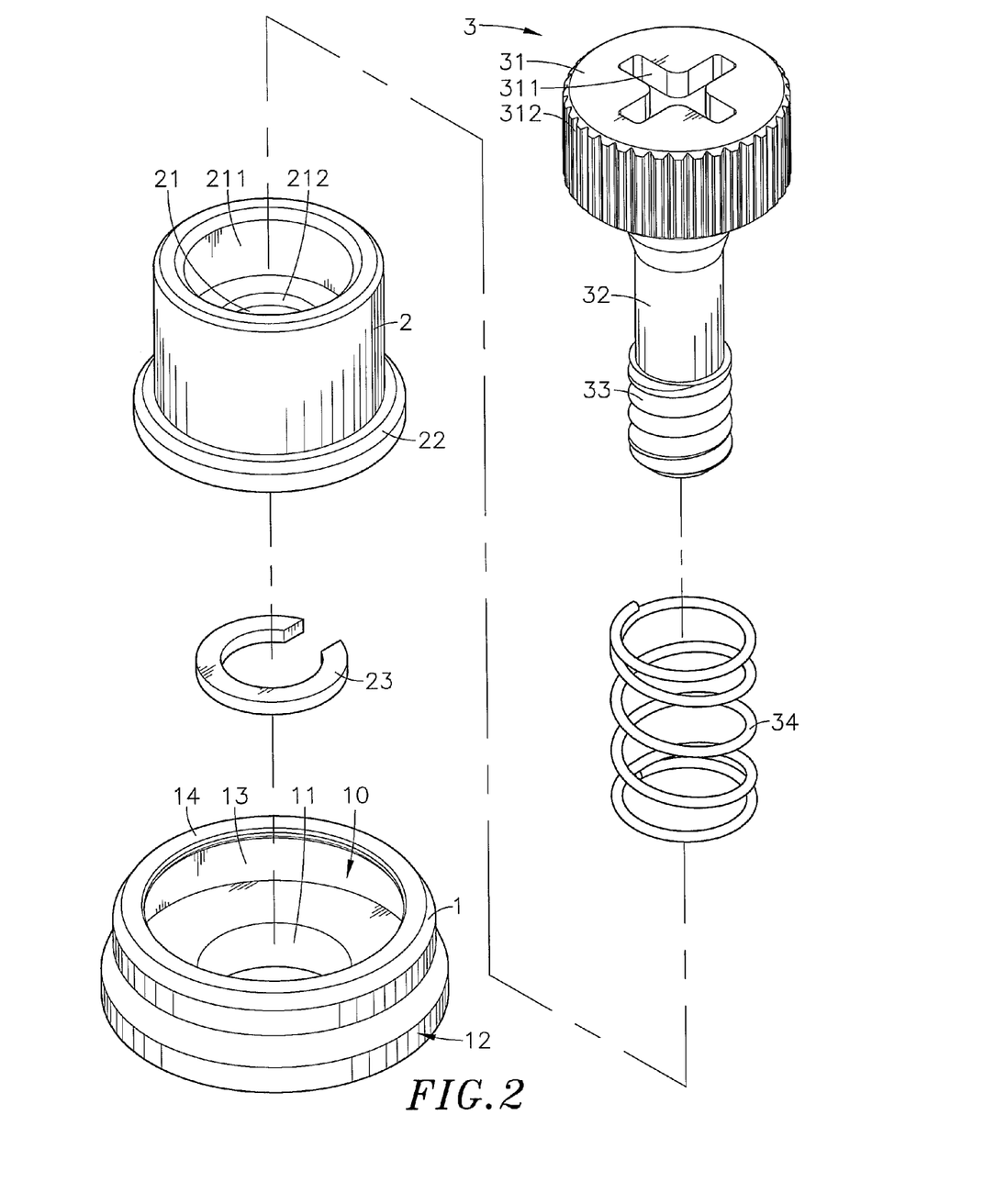
FIG. 2 is an exploded view of the floating fastener in accordance with the first embodiment of the present invention.
Figure 3:
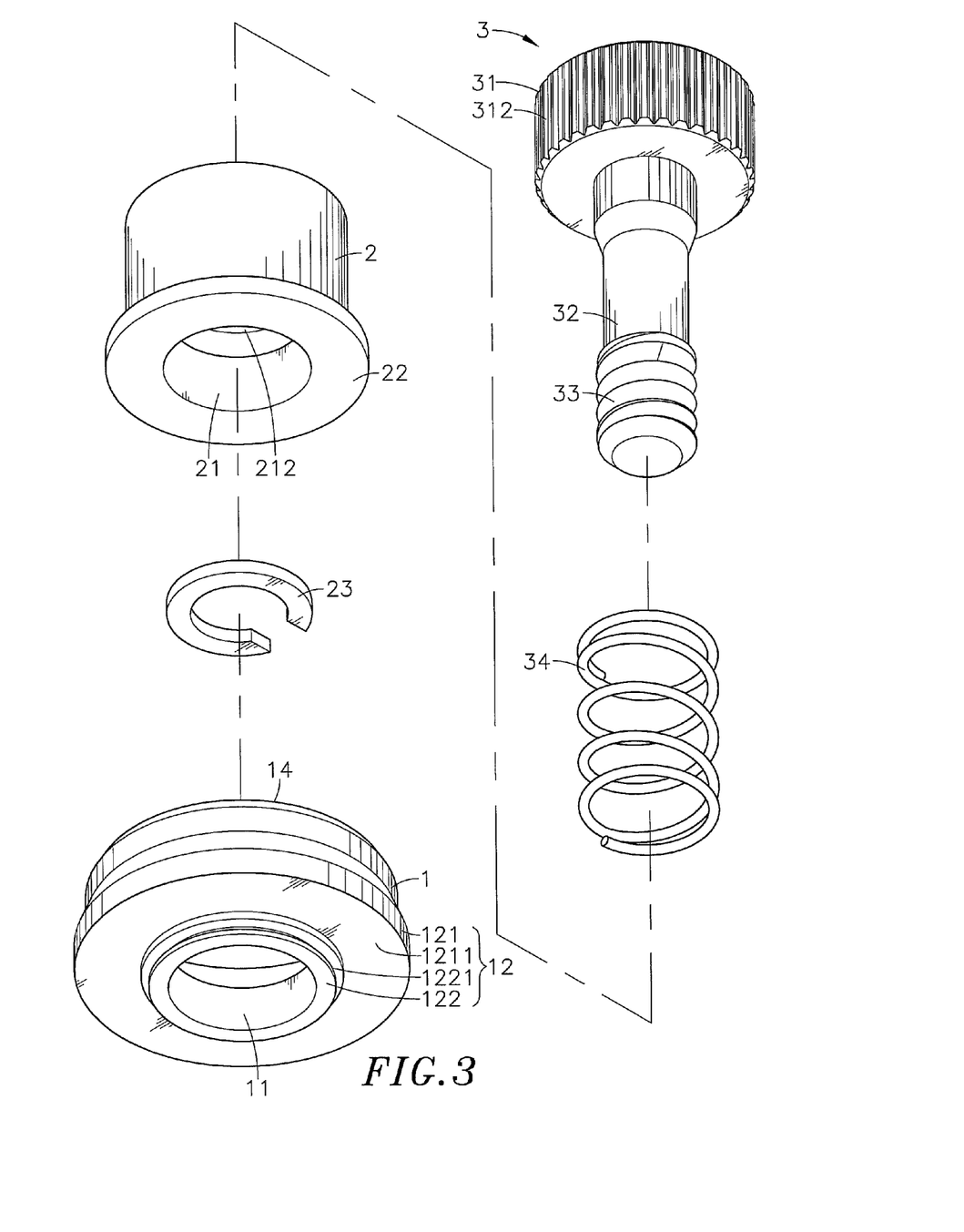
FIG. 3 is another exploded view of the floating fastener in accordance with the first embodiment of the present invention when viewed from another angle.
Figure 4:
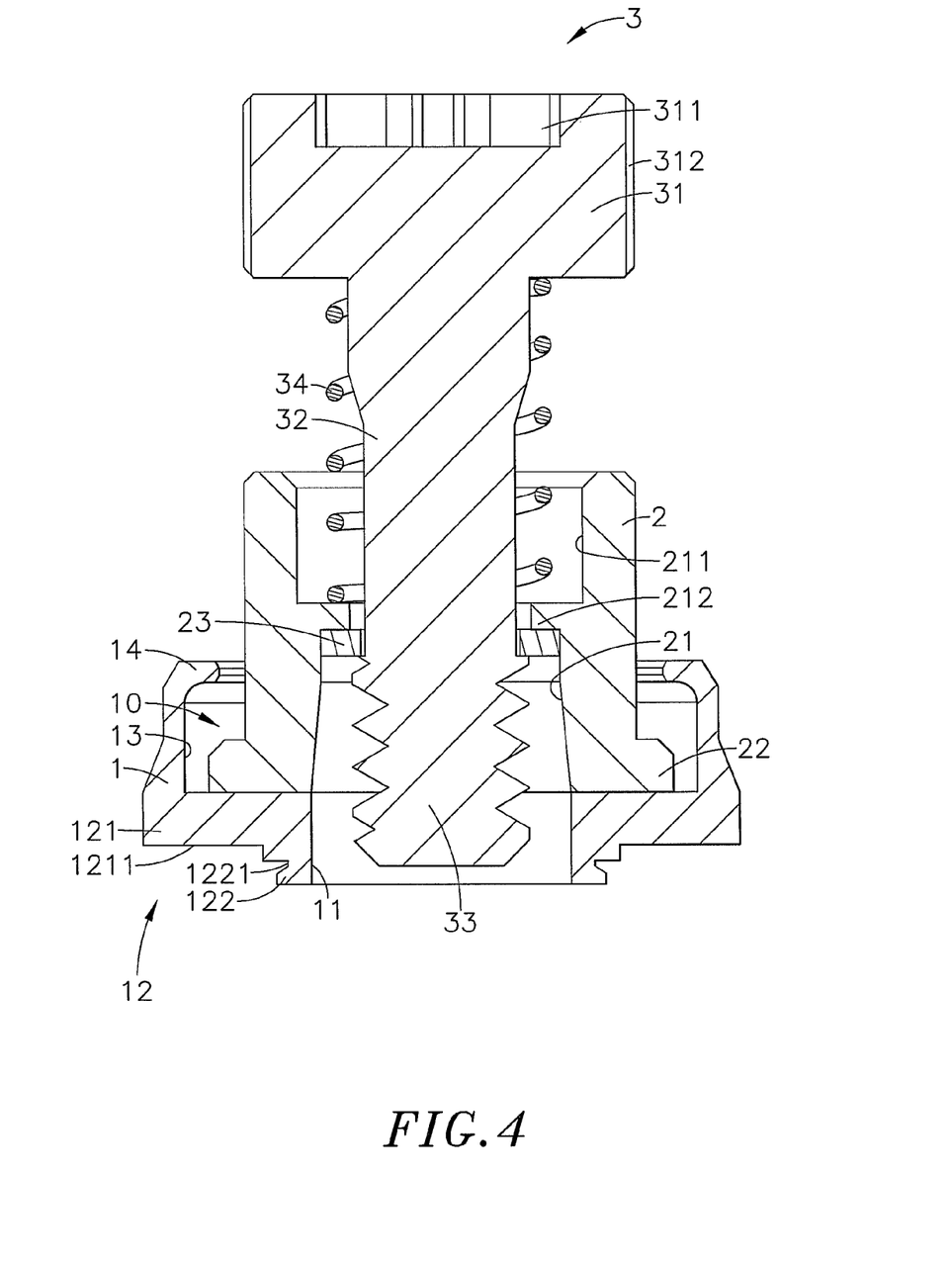
FIG. 4 is a sectional view of the floating fastener in accordance with the first embodiment of the present invention.
Figure 5:
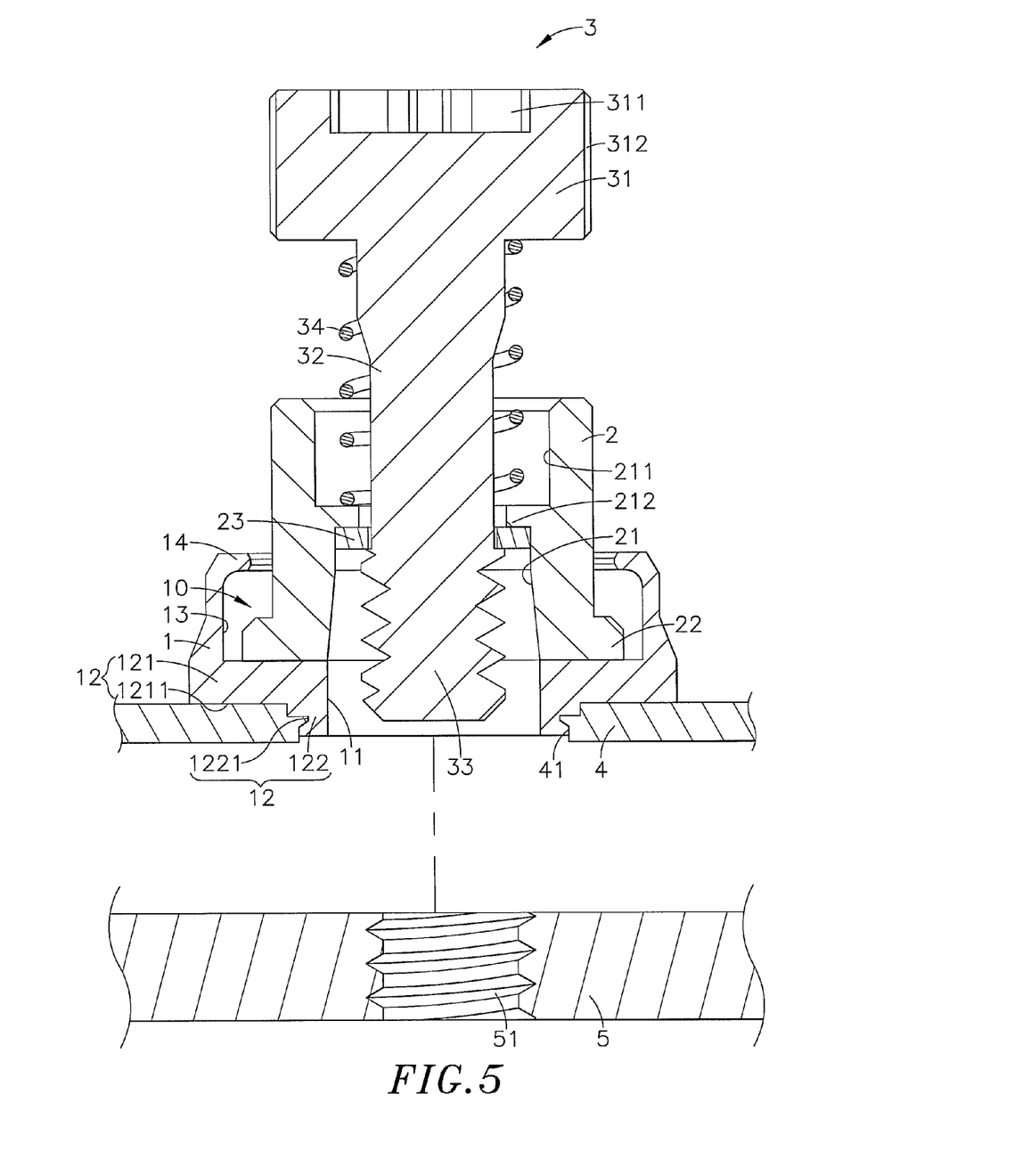
FIG. 5 is a schematic applied view of the floating fastener in accordance with the first embodiment of the present invention (I).
Figure 6:
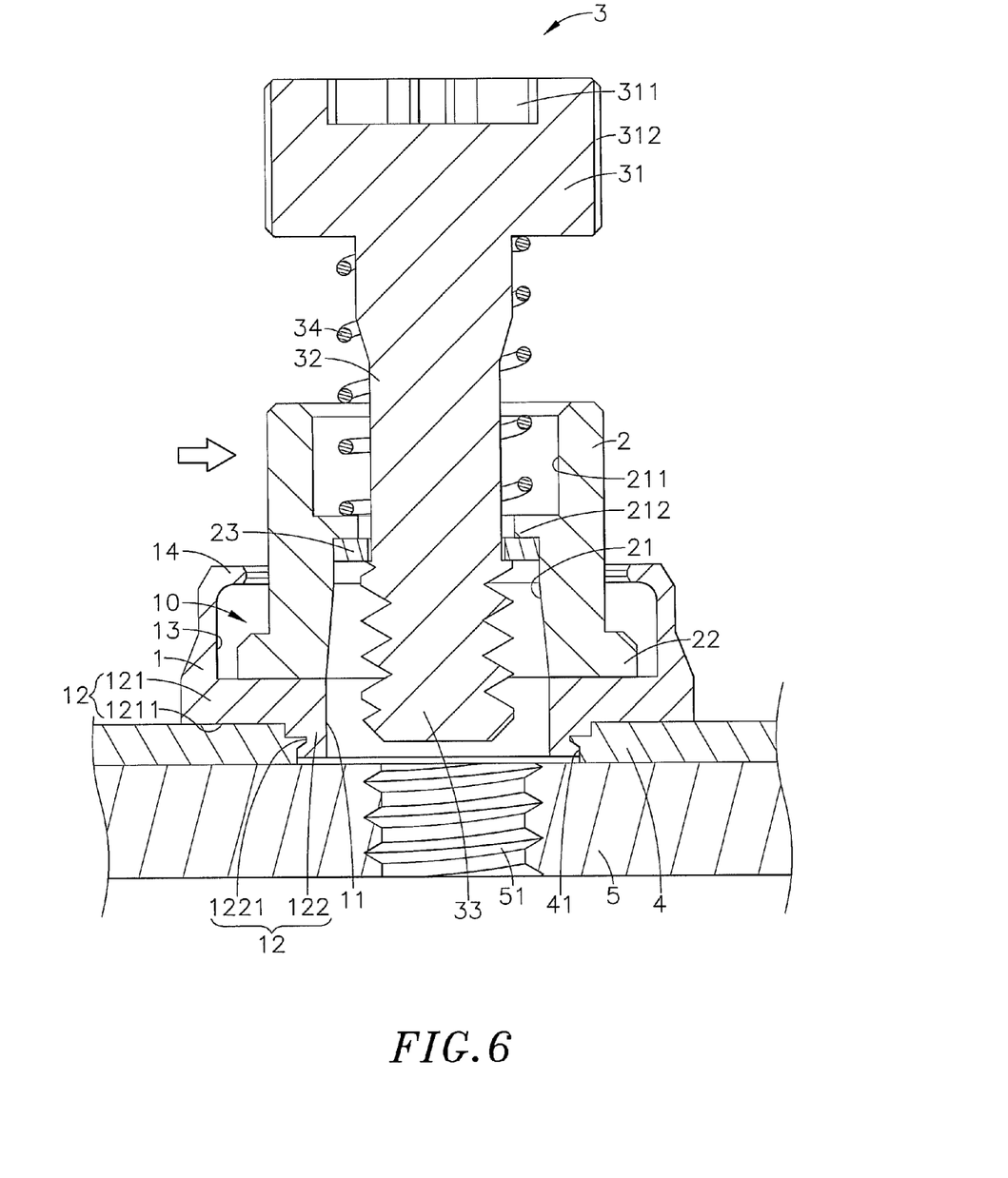
FIG. 6 is a schematic applied view of the floating fastener in accordance with the first embodiment of the present invention (II).
Figure 7:
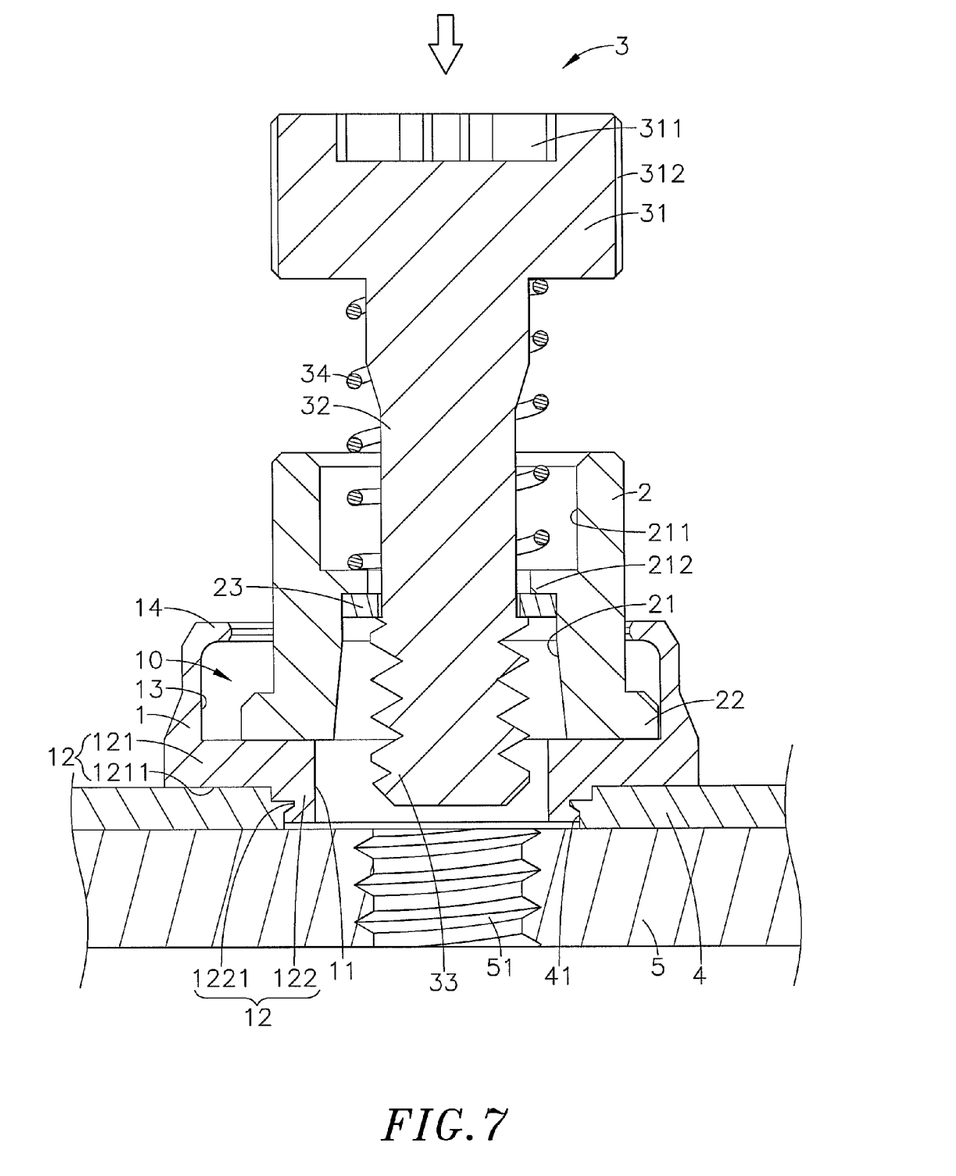
FIG. 7 is a schematic applied view of the floating fastener in accordance with the first embodiment of the present invention (III).
Figure 8:
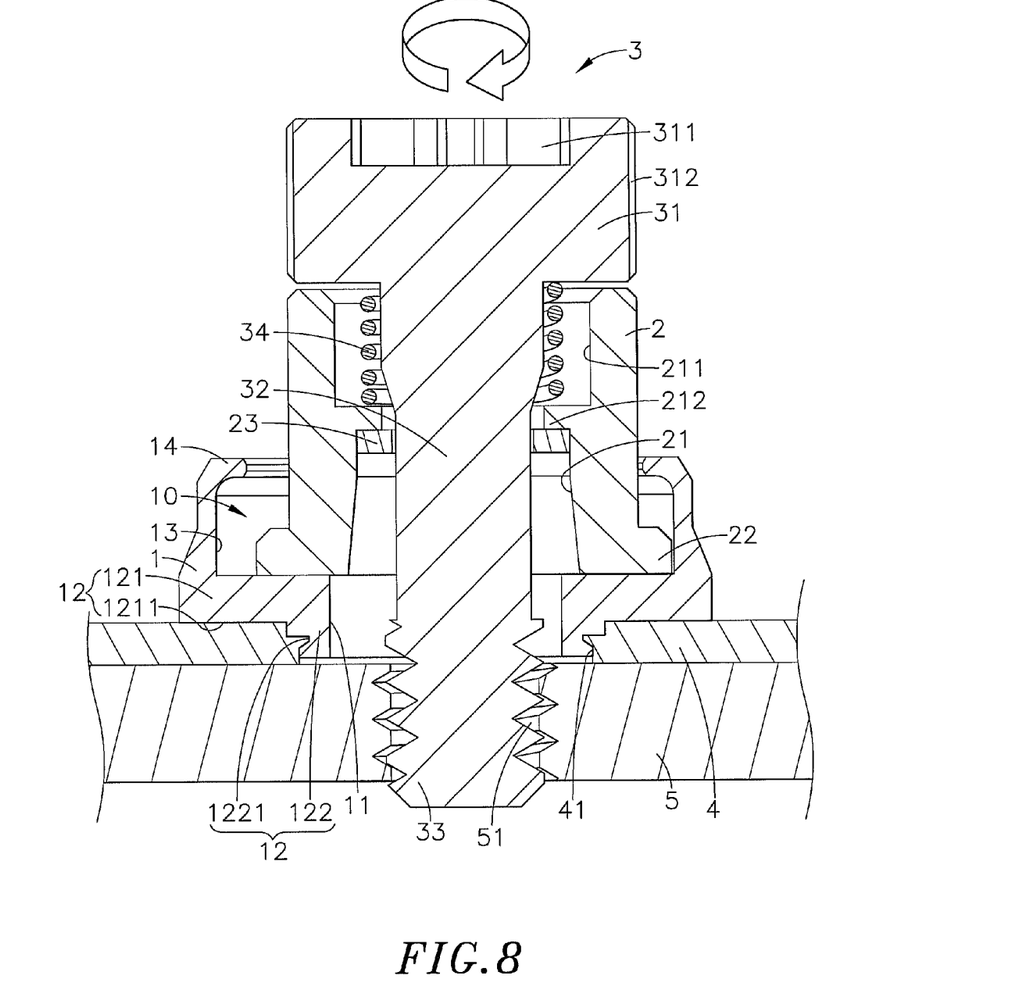
FIG. 8 is a schematic applied view of the floating fastener in accordance with the first embodiment of the present invention (IV).
Figure 9:
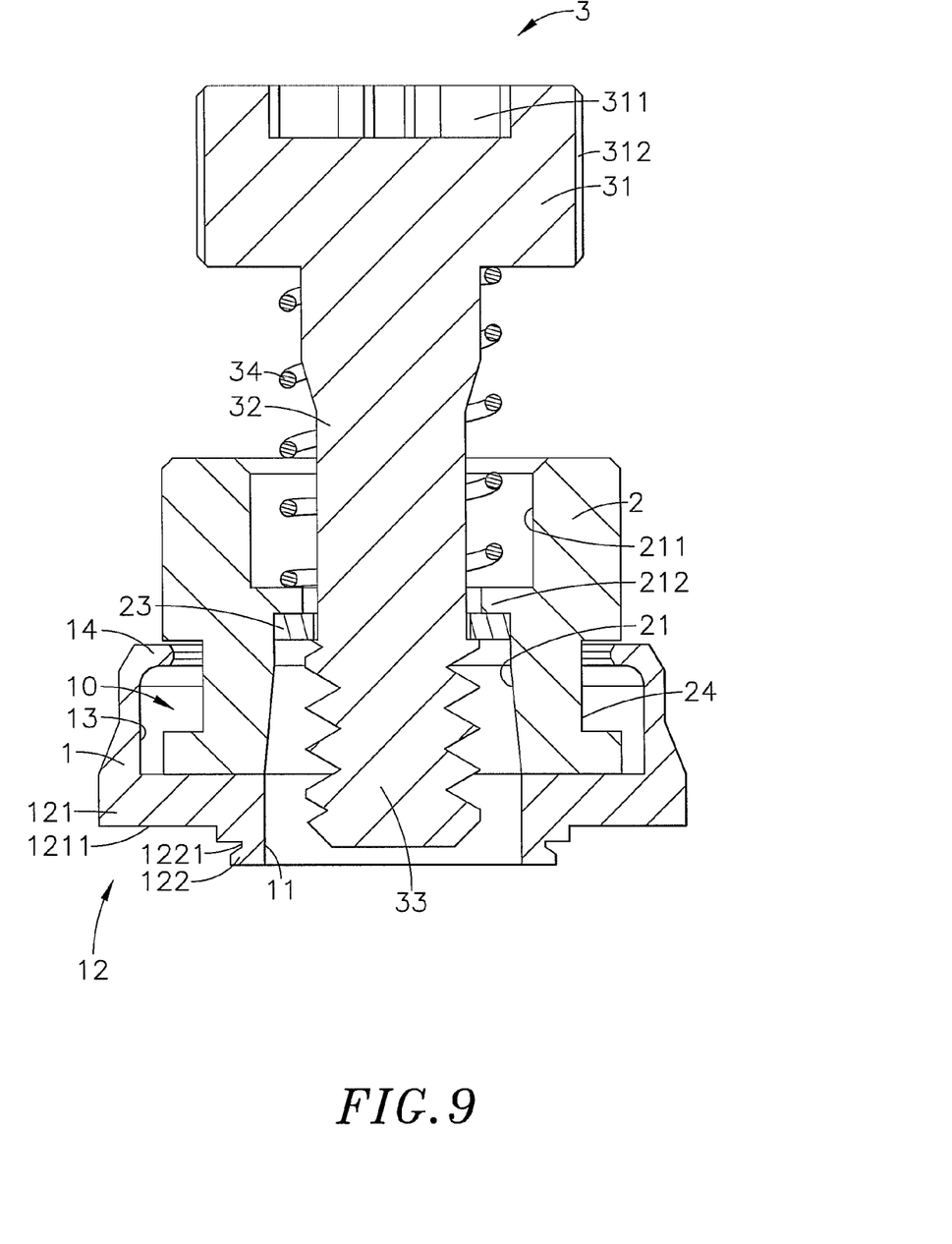
FIG. 9 is a sectional side view of a floating fastener in accordance with a second embodiment of the present invention.

Referring to FIG. 9, a floating fastener in accordance with a second embodiment of the present invention is shown. This second embodiment is substantially similar to the aforesaid first embodiment with the exception that the socket 2 comprises a limiter groove 24 extending around the periphery thereof; the inward rim 14 of the mounting base member 1 is coupled to the limiter groove 24 in such a manner that the socket 2 can be moved vertically and horizontally relative to the mounting base member 1 within a predetermined range subject to the constraint of the height of the limiter groove 24 and the inner diameter of the inward rim 14.

Further, the bottom mounting part 12 of the mounting base member 1 of either of the aforesaid two embodiments can be bonded to the mounting through hole 41 of the first panel member 4 with the application of a solder paste, i.e., a solder paste can be applied to the top wall of the first panel member 4 around the mounting through hole 41 or the flat bottom wall 1211 of the base portion 121 of the bottom mounting part 12 of the mounting base member 4 before inserting the annular bottom flange 122 of the bottom mounting part 12 of the mounting base member 1 into the mounting through hole 41 of the first panel member 4.

Further, in another alternate form of the present invention, the aforesaid stop member 23 is omitted, the socket 2 is configured to provide an annular top stop flange (not shown) around the periphery of the top side thereof, and a cap member (not shown) is molded on the head 31 of the lock screw 3 by insert molding and coupled to the socket 2 and axially movable along the outside wall of the socket 2 between the annular top stop flange of the socket 2 and the inward rim 14 of the mounting base member 1.

A prototype of floating fastener has been constructed with the features of FIGS. 1-9. The floating fastener functions smoothly to provide all of the features disclosed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A floating fastener affixed to a mounting through hole of a first panel member and detachably fastened to a mounting screw hole of a second panel member to lock said first panel member to said second panel member, the floating fastener comprising:
   a mounting base member comprising an open-top accommodation chamber, a bottom mounting part disposed at a bottom side of said open-top accommodation chamber, a center through hole vertically cut through opposing top and bottom sides of said bottom mounting part in communication with said open-top accommodation chamber, and an inward rim suspending above said open-top accommodation chamber and defining a floating space in said open-top accommodation chamber;
   a socket vertically movably coupled to said open-top accommodation chamber of said mounting base member, said socket comprising an annular bottom stop flange extending around the periphery of a bottom wall thereof in a flush manner and attached to said mounting base member around said mounting through hole and stoppable below said inward rim of said mounting base member, an open-bottom lower chamber, an open-top upper chamber disposed in communication with and having a relatively greater diameter than said open-bottom lower chamber, and an annular inside stop flange defined between said open-bottom lower chamber and said open-top upper chamber; and
   a lock screw mounted in said socket and so configured that said lock screw is movable vertically relative to said socket within a predetermined range and adapted for threading into said mounting screw hole of said second panel member to lock said first panel member to said second panel member, said lock screw comprising a head suspending above said socket, a plain shank perpendicularly extended from a center part of a bottom wall of said head and inserted through said annular inside stop flange of said socket, a screw rod axially extended from a distal end of said plain shank remote from said head and having a relatively greater outer diameter than said plain shank and movable with said plain shank in and out of said open-bottom lower chamber of said socket and said center through hole of said mounting base member for threading into said mounting screw hole of said second panel member.

2. The floating fastener as claimed in claim 1, further comprising an elastic member sleeved onto said plain shank of said lock screw and stopped between said head of said lock screw and said annular inside stop flange of said socket to impart an upward pressure to said head of said lock screw relative to said socket.

3. The floating fastener as claimed in claim 2, further comprising a stop member mounted around said plain shank of said lock screw above said screw rod and attached to a bottom side of said annular inside stop flange of said socket to limit upward displacement of said lock screw relative to said socket, said stop member defining an inner diameter smaller than the outer diameter of said screw rod.

4. The floating fastener as claimed in claim 1, wherein said annular bottom stop flange of said socket has an outer diameter greater than the diameter of said center through hole of said mounting base member.

5. A floating fastener affixed to a mounting through hole of a first panel member and detachably fastened to a mounting screw hole of a second panel member to lock said first panel member to said second panel member, the floating fastener comprising:
   a mounting base member comprising an open-top accommodation chamber, a bottom mounting part disposed at a bottom side of said open-top accommodation chamber, a center through hole vertically cut through opposing top and bottom sides of said bottom mounting part in communication with said open-top accommodation chamber, and an inward rim suspending above said open-top accommodation chamber and defining a floating space in said open-top accommodation chamber;
   a socket vertically movably coupled to said open-top accommodation chamber of said mounting base member, said socket comprising an open-bottom lower chamber, an open-top upper chamber disposed in communication with and having a relatively greater diameter than said open-bottom lower chamber, an annular inside stop flange defined between said open-bottom lower chamber and said open-top upper chamber, and a limiter groove extending around the periphery thereof and coupled to said inward rim of said mounting base member in such a manner that said socket is vertically and horizontally movable relative to said mounting base member within a limited range; and a lock screw mounted in said socket and so configured that said lock screw is movable vertically relative to said socket within a predetermined range and adapted for threading into said mounting screw hole of said second panel member to lock said first panel member to said second panel member, said lock screw comprising a head suspending above said socket, a plain shank perpendicularly extended from a center part of a bottom wall of said head and inserted through said annular inside stop flange of said socket, a screw rod axially extended from a distal end of said plain shank remote from said head and having a relatively greater outer diameter than said plain shank and movable with said plain shank in and out of said open-bottom lower chamber of said socket and said center through hole of said mounting base member for threading into said mounting screw hole of said second panel member.

6. The floating fastener as claimed in claim 5, further comprising an elastic member sleeved onto said plain shank of said lock screw and stopped between said head of said lock screw and said annular inside stop flange of said socket to impart an upward pressure to said head of said lock screw relative to said socket.

7. The floating fastener as claimed in claim 6, further comprising a stop member mounted around said plain shank of said lock screw above said screw rod and attached to a bottom side of said annular inside stop flange of said socket to limit upward displacement of said lock screw relative to said socket, said stop member defining an inner diameter smaller than the outer diameter of said screw rod.

8. The floating fastener as claimed in claim 5, as claimed in claim 1, wherein said limiter groove of said socket has an outer diameter smaller than the inner diameter of said inward rim of said mounting base member.

\* \* \* \* \*